United States Patent Office 3,410,867
Patented Nov. 12, 1968

3,410,867
MITOMYCIN DERIVATIVES
Masano Matsui, Yasuhiro Yamada, and Shigetoshi Wakaki, Tokyo, and Keizo Uzu, Shizuoka-ken, Japan, assignors to Kyowa Hakko Kogyo Co., Ltd., Tokyo, Japan, a corporation of Japan
Filed Nov. 22, 1965, Ser. No. 509,107
8 Claims. (Cl. 260—326.3)

ABSTRACT OF THE DISCLOSURE

Phosphorus-containing derivatives of mitomycin C and a process for the preparation thereof which comprises reacting mitomycin C with the reaction product of phosphorus oxychloride and monoethanolamine. The resultant derivatives show anti-tumor properties in animals and also exhibit antibacterial activity.

---

Figure 1:
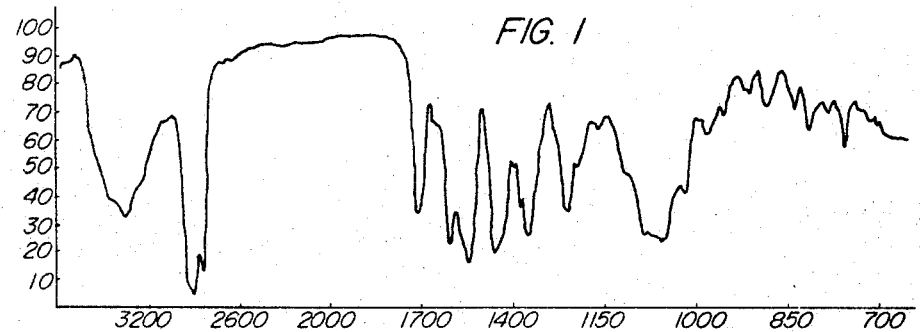

The present invention relates to novel derivatives of mitomycin C and to a process for the preparation thereof.

In 1956, mitomcyin A and mitomycin B—compounds having anti-tumor potency as well as antibacterial activity—were isolated by Hata et al. from a culture medium of *Streptomyces caespitosus*. Subsequently, Wakaki et al. isolated mitomcyin C from a culture medium of the same microorganism. It is known that mitomcyin C, which also has anti-tumor and antibacterial activities, is one of the most potent of the known anti-tumor substances. However, its clinical utilization is restricted because of its relatively high toxicity. Thus, as is pointed out on page 687 of The Merck Index, Seventh Edition (1960), published by Merck & Co., Inc., Rahway, N.J., mitomycin C has been used primarily against far advanced malignancies.

The chemical structure of mitomycin C has recently been determined to correspond to the formula

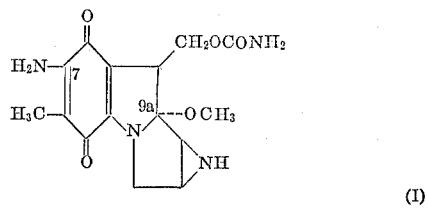

Mitomycin C

The compound can also be designated 7-amino-9a-methoxymitosane.

It is a desideratum in this art to embody new compounds which retain the advantages of mitomycin C, i.e., possess the anti-tumor and antibacterial potencies thereof, but are free of the disadvantage thereof, i.e., they have such a reduced toxicity relative to mitomycin as to effectively broaden the possibilities of use thereof.

The present invention realizes this desideratum by providing phosphorus-containing derivatives of mitomycin C which are of reduced toxicity in comparison with the latter but which retain, presumably because the 7-amino-9a-methoxymitosane structure is essentially intact, the efficacies of mitomycin C as such.

In the first stage of the process for the preparation of the said new phosphorus derivatives of mitomycin C, phosphorus oxychloride and monoethanolamine are reacted in the presence of triethylamine in dioxane or tetrahydrofuran and at a temperature of about 0° C. In the second stage, mitomycin C in a solution of dioxane or tetrahydrofuran is added dropwise into the first stage reaction mixture, thereby producing two derivatives of mitomycin C, each of which is less toxic than the parent mitomycin itself and each having strong anti-tumor and antibacterial activities. The chemical structures of these two derivatives being unknown, they are herein designated $M_2'$ and $M_2''$.

The reaction product of phosphorus oxychloride and monoethanolamine produced in basic medium is considered to be cyclophosphamide ester chloride, and the reaction scheme is considered to be the following:

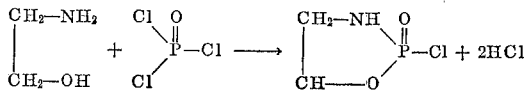

Since the isolation and purification of this reaction product are difficult and not indispensable, the said product was used as is for subsequent reaction with mitomycin C.

$M_2'$ and $M_2''$ both contain phosphorus and their ultraviolet absorptions are similar to that of mitomycin C. This indicates that the mitomycin C skeleton remains essentially intact. The precise character of the phosphorus-containing moiety and its positioning and mode of chemical binding are still obscure, however.

Moreover, $M_2'$ and $M_2''$ show almost the same infrared absorption, ultraviolet absorption and analytical values, but they show clearly different behaviors on a silica gel chromatogram as well as on thin layer chromatogram for which ethanol is used as a developing solvent, i.e., $M_2'$ is eluted from the first band and $M_2''$ is eluted from the second band.

Figure 2:
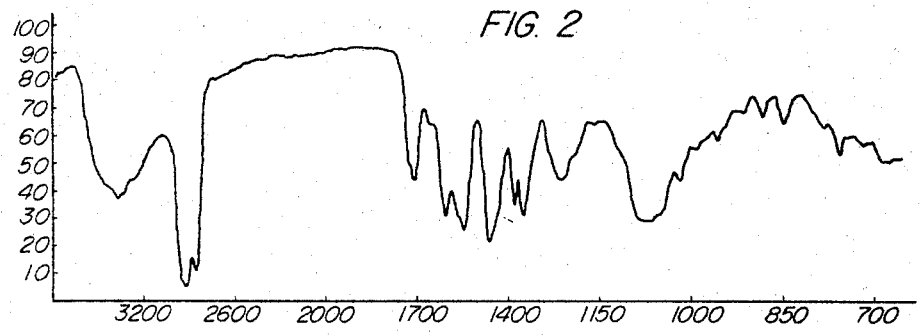

FIGS. 1 and 2 of the accompanying drawings show infrared absorption curves of the novel substances $M_2'$ and $M_2''$, respectively.

Figure 3:
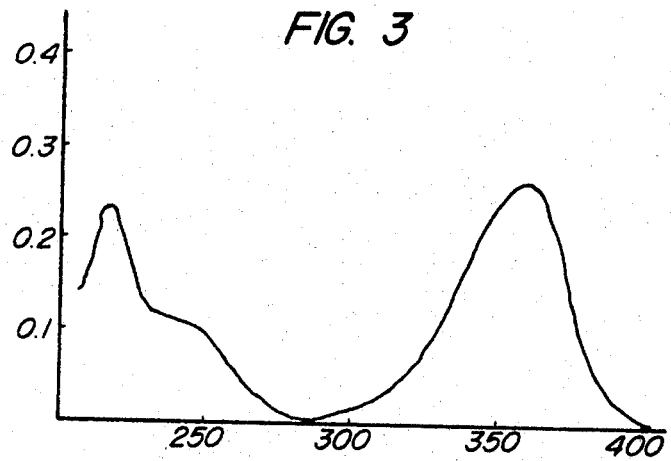
Figure 4:
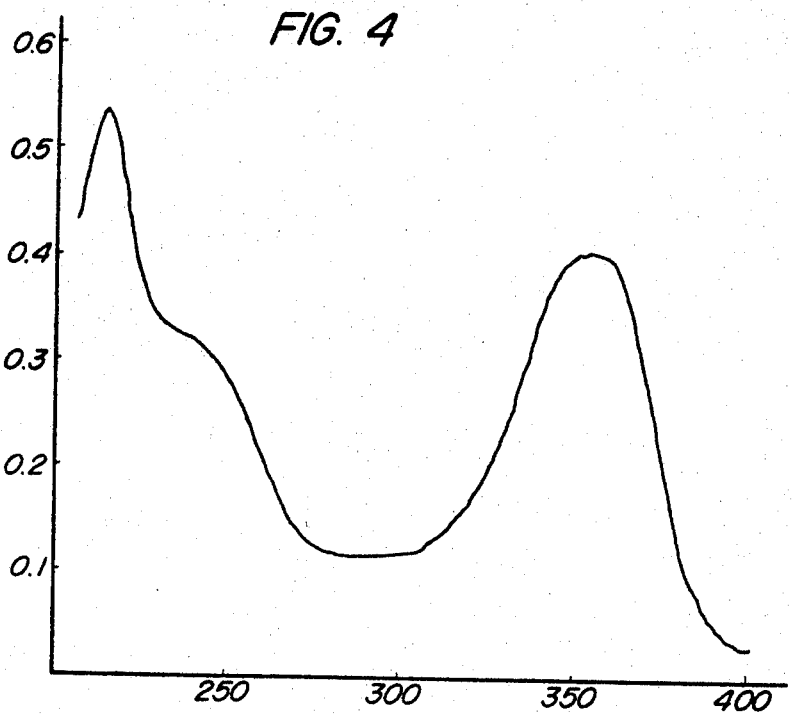

FIGS. 3 and 4 show the ultraviolet absorption curves of $M_2'$ and $M_2''$, respectively.

Toxicities of $M_2'$ and $M_2''$, the novel substances obtained by the present invention, are as shown in Table 1.

TABLE 1

| Derivative: | $LD_{50}$ (mg./kg.) (mouse) |
|---|---|
| $M_2'$ | >100 |
| $M_2''$ | >100 |

The minimum concentrations of these derivatives required for the inhibition of various kinds of bacilli, determined by the agar plate culture method are shown in Table 2.

TABLE 2

| Bacilli examined | $M_2'$ (mcg./ml.)* | $M_2''$ (mcg./ml.) |
|---|---|---|
| Staphylococcus aureus | 25 | 25 |
| Sarcina lutea | 50 | 6.25 |
| Bacillus subtilis | 6.25 | 12.5 |
| Salmonella typhi | >50 | 50 |
| Dysentery bacillus | 3.12 | 3.12 |
| Klebsiella pneumoniae | >50 | 50 |
| Proteus vulgaris | >50 | >50 |
| Escherichia coli | >50 | >50 |
| Bacillus pyocyaneus | >50 | >50 |
| Vibrio comma | 1.56 | 1.56 |
| Mycobacterium tuberculosis | 3.12 | 3.12 |
| Streptococcus haemolyticus | 6.25 | 3.12 |
| Streptococcus faecalis | 25 | 25 |
| Diplococcus pneumoniae | 0.195 | 3.12 |
| Corynebacterium diphtheriae | 3.12 | 6.25 |

*mcg./ml.=micrograms per milliliter.

Furthermore, in order to investigate anti-tumor properties, therapeutic tests for animal tumors were carried out by the conventional process using Ehrlich ascites and Hirosaki sarcoma; in these tests $M_2'$ and $M_2''$ both gave ++ and were effective.

The following examples set forth, by way of illustration but not of limitation, presently preferred typical embodiments of the invention. In these examples, percentages are by weight. Parts by weight bear the same relation to parts by volume as do grams to milliliters.

EXAMPLE 1

1 part by weight of phosphorus oxychloride is dissolved in 20 parts by volume of dioxane, to which a solution prepared by dissolving 0.1 part by weight of ethanolamine and 6 parts by weight of triethylamine in 20 parts by volume of dioxane is added dropwise at 20–30° C., followed by agitation for 10 minutes.

Subsequently, 1 part by weight of mitomycin C dissolved in 0.2 part by volume of dioxane is added and the mixture stirred at room temperature (20°–30° C.) for 1 hour.

The reaction solution is then passed through a silica gel column and washed with acetone to remove unadsorbed non-reacted mitomycin C.

The adsorbed part is eluted with methanol-ethyl acetate (1:1), and the solid obtained by concentrating the whole amount of the effluent is dissolved in 50–100 parts by volume of dimethyl formamide, precipitated triethylamine hydrochloride being filtered off.

Precipitate produced by adding ether to the filtrate is filtered off and dissolved in a small amount of methanol, which is passed through a silica gel column to effect adsorption thereof, followed by development with ethyl acetate containing 5% methanol.

The methanol content is gradually increased and a fraction eluted with ethyl acetate containing 30% ethanol is collected. The solid obtained by concentrating this fraction under reduced pressure was designed as $M_2$. The yield is 0.3 part by weight. $M_2$ is separated into two bands on a silica gel column chromatogram, performed after dissolving it in 99% ethanol. The two bands are separately eluted with ethanol and the solids obtained by concentrating these several effluents under reduced pressure are filtered, yielding $M_2'$ and $M_2''$ respectively.

$M_2'$ and $M_2''$ are both non-crystalline and reddish-brown powders. They do not show any distinct melting point, being strong hygroscopic and decomposing in a sulfuric acid desiccator.

Yield:
  $M_2'$—0.10 part by weight
  $M_2''$—0.50 part by weight

Analysis values:
  $M_2'$—C, 41.77%; H, 5.55%; N, 11.28%; P, 7.00%
  $M_2''$—C, 40.80%; H, 5.42%; N, 12.38%; P, 8.16%

Qualitative reaction for phosphoric acid observed with ammonium molybdate, benzidine and ammonium is positive and the color reaction is blue.

EXAMPLE 2

1 part by weight of phosphorus oxychloride is dissolved in 0.5 part by volume of dioxane to which a solution prepared by dissolving 0.2 part by weight of ethanolamine and 1 part by weight of triethylamine in 100 parts by volume of dioxane is added dropwise with stirring at 10° C.

Upon completion of the dropwise addition, the precipitate produced is filtered off. A solution of 1 part by weight of mitomycin C and 5 parts by weight of triethylamine dissolved in 200 parts by volume of dioxane are added dropwise to the obtained filtrate with stirring while cooling with ice, the reaction mixture being further stirred at room temperature for 3 hours after completion of the dropwise addition. 5 parts by volume of methanol are added thereto, followed by the further addition of 1,000 parts by volume of ether after which the entire reaction mass is allowed to stand overnight.

The ether layer is removed by decantation, 100 parts by volume of dimethyl formamide are added and the resulting white crystals are filtered off and washed with ethyl acetate containing 5% methanol.

Addition of ether to the filtrate produces a precipitate which is dissolved in 99% ethanol and passed through a silica gel column to obtain three separated bands.

$M_2'$ and $M_2''$ are obtained by eluting the 2nd and 3rd bands with ethanol respectively and concentrating under reduced pressure.

Yield:
  $M_2'$—0.10 part by weight
  $M_2''$—0.10 part by weight

Analysis values:
  $M_2'$—C, 41.63%; H, 6.50%; N, 11.08%; P, 7.05%
  $M_2''$—C, 40.35%; H, 5.39%; N, 12.45%; P, 3.25%

Like mitomycin C itself, the new phosphorus-containing derivatives of mitomycin C, according to the present invention, are useful in vitro as antiseptics, i.e. for disinfecting; topically and internally as therapeutic agents for combatting pathogenic bacteria, e.g., in cases of staphylodermatitis, etc. The new compounds are, like mitomycin C, also effective in causing palliation and more or less prolonged remissions in cases of morbid conditions, thereby minimizing pain in such cases.

EXAMPLE 3

One gram of $M_2'$ is homogeneously incorporated with about 500 grams of an ointment base (Vaseline). Repeated application of this ointment to topical infections due to Staph. aureus exhibits a curative effect.

The Vaseline may be replaced by any other suitable and desired conventional ointment base. The $M_2'$ may be replaced by $M_2''$ with like effect.

EXAMPLE 4

Powder form $M_2'$ spread over raw fish is found to inhibit putrefaction of the latter so that it remains fresh for a relatively prolonged period of time. Powder form $M_2''$ has a similar action.

The invention being thus described, it will be obvious that the same may be varied in many ways. Such variations are not to be regarded as a departure from the spirit and scope of the invention, and all such modifications are intended to be included within the scope of the following claims.

What is claimed is:
1. A method of preparing phosphorus-containing derivatives of mitomycin C which comprises reacting mitomycin C with the reaction product of phosphorus oxychloride and monoethanolamine produced in a basic medium comprising an organic amine.

2. A phosphorus-containing derivative of mitomycin C which is the reaction product of mitomycin C with the reaction product of phosphorus oxychloride and monoethanolamine produced in a basic medium comprising an organic amine.

3. The method of claim 1, wherein the reactions are carried out in an inert solvent.

4. The method of claim 3, wherein said inert solvent is selected from the group consisting of dioxane and tetrahydrofuran.

5. A method of preparing phosphorus-containing derivatives of mitomycin C which comprises reacting phosphorus oxychloride and monoethanolamine in the presence of triethylamine and then reacting the resultant reaction product thereof with mitomycin C.

6. The method of claim 5, wherein the reactions are carried out in an inert solvent.

7. The method of claim 6, wherein said inert solvent is selected from the group consisting of dioxane and tetrahydrofuran.

8. The method of claim 7, wherein said reaction product is reacted with an inert solvent solution of mitomycin C containing triethylamine.

No references cited.

NICHOLAS S. RIZZO, Primary Examiner.

JOSE TOVAR, Assistant Examiner.